United States Patent
Nakata et al.

(10) Patent No.: US 7,207,173 B2
(45) Date of Patent: Apr. 24, 2007

(54) METHOD AND APPARATUS FOR WARM UP CONTROL OF AUTONOMOUS INVERTER-DRIVEN HYDRAULIC UNIT

(75) Inventors: Tetsuo Nakata, Kusatsu (JP); Yasuto Yanagida, Kusatsu (JP); Yoshiyuki Ochi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/534,698

(22) PCT Filed: Nov. 17, 2003

(86) PCT No.: PCT/JP03/14612

§ 371 (c)(1),
(2), (4) Date: Oct. 12, 2005

(87) PCT Pub. No.: WO2004/046562

PCT Pub. Date: Jun. 3, 2004

(65) Prior Publication Data

US 2006/0150621 A1     Jul. 13, 2006

(30) Foreign Application Priority Data

Nov. 15, 2002    (JP) ............................. 2002-331568

(51) Int. Cl.
*H02P 6/00*     (2006.01)
*F15B 21/04*    (2006.01)
*E02F 9/22*     (2006.01)
*H02P 7/00*     (2006.01)

(52) U.S. Cl. .............................. 60/329; 60/456; 91/419
(58) Field of Classification Search .................. 60/327, 60/329, 456, 912; 91/419; 187/393
See application file for complete search history.

(56) References Cited

FOREIGN PATENT DOCUMENTS

| EP | 0479464 A2 | 4/1992 |
|---|---|---|
| JP | 5446990 U  *  | 9/1977 |
| JP | 54-46990 U1 | 3/1979 |
| JP | 60-165558 U1 | 11/1985 |
| JP | 60165558 U  *  | 11/1985 |
| JP | 63-170571 A | 7/1988 |
| JP | 3-158376 A | 7/1991 |
| JP | 9-33145 A | 2/1997 |
| JP | 9-216782 A | 8/1997 |
| JP | 9-255262 A | 9/1997 |
| JP | 2002-61611 A | 2/2002 |

* cited by examiner

Primary Examiner—Thomas E. Lazo
(74) Attorney, Agent, or Firm—Global IP Counselors

(57) ABSTRACT

An apparatus for warm up control of an autonomous inverter-driven hydraulic unit has a warm up control section and a switch section. The warm up control section performs a predetermined process using a current speed and current pressure as input information and outputs a first switch command. The switch section is controlled by the first switch command so as to control on/off of power supplied to a fan motor. The apparatus causes an oil temperature to quickly rise to a level where a hydraulic unit driven by a hydraulic pump can work in an optimum condition.

17 Claims, 4 Drawing Sheets

METHOD AND APPARATUS FOR WARM UP CONTROL OF AUTONOMOUS INVERTER-DRIVEN HYDRAULIC UNIT

CROSS-REFERENCE TO RELATED APPLICATIONS

This nonprovisional application claims priority under 35 U.S.C. §119(a) to Japanese Patent Application Nos. 2002-331568, filed in Japan on Nov. 15, 2002, the entire content of which is hereby incorporated by reference.

1. Technical Field

The present invention relates to a method and apparatus for warm up control of an autonomous inverter-driven hydraulic unit. More particularly, the present invention relates to an autonomous inverter-driven hydraulic unit which controls a fixed displacement pump coupled to a motor so as to control an oil pressure and a flow rate, the unit being used in a hydraulic driving apparatus such as a machine tool which is driven using pressured oil as driving source.

2. Background Art

A conventional hydraulic unit employs an arrangement, as is illustrated in FIG. 1, for example, for start-stop a hydraulic pump directly coupled to a motor by turning a power source on/off. And, for simplification in control, a radiator fan is interlocked with the start-stop.

It can be thought that a flow rate is increased by increasing a revolution, oil is returned to a tank from a relief valve or a hydraulic driving apparatus, and an oil temperature is raised by a pressure drop.

When the former arrangement is employed, the radiator fan is unconditionally started upon turning the power source on. Therefore, a necessary time period for rising the oil temperature becomes extremely longer when the oil temperature is low, and when the oil temperature is required to rise rapidly.

When the latter arrangement is employed, and when a hydraulic pump is a variable volume type pump, an additional hydraulic circuit for rising temperature is required because a flow rate is automatically varied in response to a load pressure. Also, the flow rate is decreased following the rising in load pressure due to the characteristics of the variable volume pump, so that a set value in pressure of a relief valve within a temperature rising circuit cannot be determined to be too higher value. Therefore, the rising in oil temperature due to the losses in pressure at the relief valve cannot be greatly expected, and as a result, a necessary time period for rising the oil temperature becomes longer due to the multiplier effect with the radiator fan. Further, a number of components such as temperature sensor and the like, becomes greater so that increase in cost is realized.

When the latter arrangement is employed, and when a hydraulic pump is a fixed volume type pump, and when the hydraulic pump is driven by a motor in which permanent magnets are mounted to a rotor, the hydraulic pump is difficult to be driven at high speed because a motor current cannot be flowed into the motor when a speed electromotive force becomes greater than a power source voltage. Therefore, the rising in oil temperature due to the losses in pressure at the relief valve cannot be greatly expected, and as a result, a necessary time period for rising the oil temperature becomes longer due to the multiplier effect with the radiator fan, similarly to that of the variable volume pump.

SUMMARY OF THE INVENTION

The present invention was made in view of the above problems.

It is an object of the present invention to provide a method and apparatus for warm up control of an autonomous inverter-driven hydraulic unit which can rapidly rise an oil temperature to an oil temperature at which a hydraulic unit driven by a hydraulic pump can work in an optimum condition.

A method for warm up control of an autonomous inverter-driven hydraulic unit of a first aspect according to the present invention, the autonomous inverter-driven hydraulic unit driving a fixed volume hydraulic pump using a motor controlled by an inverter, having a heat radiation section provided at a predetermined position of a circulation flow path of an oil which is discharged by the fixed volume hydraulic pump, the method comprises detecting a temperature of the oil flowing the circulation flow path, judging whether or not the detected oil temperature is equal to or less than a predetermined reference temperature, and heating-up the heat radiation section in response to the judgment that the oil temperature is equal to or less than the predetermined reference temperature.

A method for warm up control of an autonomous inverter-driven hydraulic unit of a second aspect according to the present invention employs a radiator as the heat radiation section, and carries out heating-up the heat radiation section by controlling a radiator fan so as to lower the heat radiation efficiency of the radiator.

A method for warm up control of an autonomous inverter-driven hydraulic unit of a third aspect according to the present invention carries out the detection of an oil temperature by estimating an oil temperature from a revolution of the motor when a pressure is controlled.

A method for warm up control of an autonomous inverter-driven hydraulic unit of a fourth aspect according to the present invention carries out the detection of an oil temperature by estimating an oil temperature from a pressure when a flow rate is controlled. Wherein, the flow rate controlling may be performed by revolution controlling.

A method for warm up control of an autonomous inverter-driven hydraulic unit of a fifth aspect according to the present invention employs decreasing a revolution of the radiator fan or stopping the radiator fan as the controlling of the radiator fan which is carried out for lowering the heat radiation efficiency.

A method for warm up control of an autonomous inverter-driven hydraulic unit of a sixth aspect according to the present invention, the autonomous inverter-driven hydraulic unit being arranged to drive a fixed volume hydraulic pump using an integral-type motor controlled by an inverter, the method comprises detecting a temperature of the oil flowing a circulation flow path, judging whether or not the detected oil temperature is equal to or less than a predetermined reference temperature, and shifting a current phase from an optimum current phase for increasing heat generation of the motor in response to the judgment result indicating that the oil temperature is equal to or less than the predetermined reference temperature.

A method for warm up control of an autonomous inverter-driven hydraulic unit of a seventh aspect according to the present invention employs a brushless DC motor as the motor, and carries out the processing for shifting a current phase from an optimum current phase by shifting a current phase in leading phase side with respect to a speed electromotive force so as to increase a maximum revolution.

An apparatus for warm up control of an autonomous inverter-driven hydraulic unit of an eighth aspect according to the present invention, the autonomous inverter-driven hydraulic unit driving a fixed volume hydraulic pump using a motor controlled by an inverter, having a heat radiation section provided at a predetermined position of a circulation flow path of an oil which is discharged by the fixed volume hydraulic pump, the apparatus comprises an oil temperature detection section for detecting a temperature of the oil flowing the circulation flow path, a judgment section for judging whether or not the detected oil temperature is equal to or less than a predetermined reference temperature, and a warm up section for heating-up the heat radiation section in response to the judgment by the judgment section that the oil temperature is equal to or less than the predetermined reference temperature.

An apparatus for warm up control of an autonomous inverter-driven hydraulic unit of a ninth aspect according to the present invention employs a radiator as the heat radiation section, employs a radiator fan controlling section for controlling a radiator fan as the warm up section, and controls the radiator fan so as to lower the heat radiation efficiency of the radiator in response to the judgment result obtained by the judgment section indicating that the oil temperature is equal to or less than the predetermined reference temperature.

An apparatus for warm up control of an autonomous inverter-driven hydraulic unit of a tenth aspect according to the present invention employs a section which carries out the detection of an oil temperature by estimating an oil temperature from a revolution of the motor when a pressure is controlled, as the oil temperature detection section.

An apparatus for warm up control of an autonomous inverter-driven hydraulic unit of an eleventh aspect according to the present invention employs a section which carries out the detection of an oil temperature by estimating an oil temperature from a pressure when a flow rate is controlled, as the oil temperature detection section. Wherein, the flow rate controlling may be performed by revolution controlling.

An apparatus for warm up control of an autonomous inverter-driven hydraulic unit of a twelfth aspect according to the present invention employs a section which decreases a revolution of the radiator fan or stops the radiator fan for lowering the heat radiation efficiency, as the radiator fan controlling section.

An apparatus for warm up control of an autonomous inverter-driven hydraulic unit of a thirteenth aspect according to the present invention, the autonomous inverter-driven hydraulic unit being arranged to drive a fixed volume hydraulic pump using an integral-type motor controlled by an inverter, the apparatus comprises an oil temperature detection section for detecting a temperature of the oil flowing a circulation flow path, a judgment section for judging whether or not the detected oil temperature is equal to or less than a predetermined reference temperature, and a current phase controlling section for shifting a current phase from an optimum current phase for increasing heat generation of the motor in response to the judgment result of the judgment section indicating that the oil temperature is equal to or less than the predetermined reference temperature.

An apparatus for warm up control of an autonomous inverter-driven hydraulic unit of a fourteenth aspect according to the present invention employs a brushless DC motor as the motor, and employs a section which carries out the processing for shifting a current phase from an optimum current phase by shifting a current phase in leading phase side with respect to a speed electromotive force so as to increase a maximum revolution, as the current phase controlling section.

When the method for warm up control of an autonomous inverter-driven hydraulic unit of a first aspect according to the present invention is employed, the autonomous inverter-driven hydraulic unit drives a fixed volume hydraulic pump using a motor controlled by an inverter, has a heat radiation section provided at a predetermined position of a circulation flow path of an oil which is discharged by the fixed volume hydraulic pump, and the method detects a temperature of the oil flowing the circulation flow path, judges whether or not the detected oil temperature is equal to or less than a predetermined reference temperature, and heats-up the heat radiation section in response to the judgment that the oil temperature is equal to or less than the predetermined reference temperature. Therefore, an oil temperature can be rapidly risen by heating-up the heat radiation section.

When the method for warm up control of an autonomous inverter-driven hydraulic unit of a second aspect according to the present invention is employed, a radiator is employed as the heat radiation section, and heating-up the heat radiation section is carried out by controlling a radiator fan so as to lower the heat radiation efficiency of the radiator, Therefore, operation and effect similar to those of the first aspect are realized by carrying out simple controlling which controls the radiator fan.

When the method for warm up control of an autonomous inverter-driven hydraulic unit of a third aspect according to the present invention is employed, the detection of an oil temperature is carried out by estimating an oil temperature from a revolution of the motor when a pressure is controlled. Therefore, operation and effect similar to those of the first aspect or second aspect are realized with no oil temperature sensors.

When the method for warm up control of an autonomous inverter-driven hydraulic unit of a fourth aspect according to the present invention is employed, the detection of an oil temperature is carried out by estimating an oil temperature from a pressure when a flow rate is controlled. Therefore, operation and effect similar to those of the first aspect or second aspect are realized with no oil temperature sensors.

When the method for warm up control of an autonomous inverter-driven hydraulic unit of a fifth aspect according to the present invention is employed, decreasing a revolution of the radiator fan or stopping the radiator fan is employed as the controlling of the radiator fan which is carried out for lowering the heat radiation efficiency. Therefore, operation and effect similar to those of the second aspect are realized.

When the method for warm up control of an autonomous inverter-driven hydraulic unit of a sixth aspect according to the present invention is employed, the autonomous inverter-driven hydraulic unit is arranged to drive a fixed volume hydraulic pump using an integral-type motor controlled by an inverter, and the method detects a temperature of the oil flowing a circulation flow path, judges whether or not the detected oil temperature is equal to or less than a predetermined reference temperature, and shifts a current phase from an optimum current phase for increasing heat generation of the motor in response to the judgment that the oil temperature is equal to or less than the predetermined reference temperature. Therefore, heat generation of the motor is increased by increasing wattless current, the oil temperature is rapidly risen, consequently.

When the method for warm up control of an autonomous inverter-driven hydraulic unit of a seventh aspect according to the present invention is employed, a brushless DC motor is employed as the motor, and the processing for shifting a current phase from an optimum current phase is carried out by shifting a current phase in leading phase side with respect to a speed electromotive force so as to increase a maximum revolution. Therefore, flow rate is increased by driving the brushless DC motor at a higher revolution, the oil temperature is more rapidly risen, consequently.

When the apparatus for warm up control of an autonomous inverter-driven hydraulic unit of an eighth aspect according to the present invention is employed, the autonomous inverter-driven hydraulic unit drives a fixed volume hydraulic pump using a motor controlled by an inverter, and has a heat radiation section provided at a predetermined position of a circulation flow path of an oil which is discharged by the fixed volume hydraulic pump, and the apparatus detects a temperature of the oil flowing the circulation flow path using the oil temperature detection section, judges whether or not the detected oil temperature is equal to or less than a predetermined reference temperature using the judgment section, and heats-up the heat radiation section in response to the judgment by the judgment section that the oil temperature is equal to or less than the predetermined reference temperature, using the temperature rise section.

Therefore, an oil temperature can be rapidly risen by heating-up the heat radiation section.

When the apparatus for warm up control of an autonomous inverter-driven hydraulic unit of a ninth aspect according to the present invention is employed, a radiator is employed as the heat radiation section, a radiator fan controlling section for controlling a radiator fan is employed as the warm up section, and the apparatus controls the radiator fan so as to lower the heat radiation efficiency of the radiator in response to the judgment result obtained by the judgment section that the oil temperature is equal to or less than the predetermined reference temperature. Therefore, operation and effect similar to those of the eighth aspect are realized by carrying out simple controlling which controls the radiator fan.

When the apparatus for warm up control of an autonomous inverter-driven hydraulic unit of a tenth aspect according to the present invention is employed, a section which carries out the detection of an oil temperature by estimating an oil temperature from a revolution of the motor when a pressure is controlled, is employed as the oil temperature detection section. Therefore, operation and effect similar to those of the eighth aspect or ninth aspect are realized with no oil temperature sensors.

When the apparatus for warm up control of an autonomous inverter-driven hydraulic unit of an eleventh aspect according to the present invention is employed, a section which carries out the detection of an oil temperature by estimating an oil temperature from a pressure when a flow rate is controlled, is employed as the oil temperature detection section. Therefore, operation and effect similar to those of the eighth aspect or ninth aspect are realized with no oil temperature sensors.

When the apparatus for warm up control of an autonomous inverter-driven hydraulic unit of a twelfth aspect according to the present invention is employed, a section which decreases a revolution of the radiator fan or stops the radiator fan for lowering the heat radiation efficiency, is employed as the radiator fan controlling section. Therefore, operation and effect similar to those of the ninth aspect are realized.

When the apparatus for warm up control of an autonomous inverter-driven hydraulic unit of a thirteenth aspect according to the present invention is employed, the autonomous inverter-driven hydraulic unit is arranged to drive a fixed volume hydraulic pump using an integral-type motor controlled by an inverter, the apparatus detects a temperature of the oil flowing a circulation flow path using the oil temperature detection section, judges whether or not the detected oil temperature is equal to or less than a predetermined reference temperature using the judgment section, and shifts a current phase from an optimum current phase for increasing heat generation of the motor in response to the judgment result of the judgment section that the oil temperature is equal to or less than the predetermined reference temperature using the current phase controlling section.

Therefore, heat generation of the motor is increased by increasing wattless current, the oil temperature is rapidly risen, consequently, When the apparatus for warm up control of an autonomous inverter-driven hydraulic unit of a fourteenth aspect according to the present invention is employed, a brushless DC motor is employed as the motor, and a section which carries out the processing for shifting a current phase from an optimum current phase by shifting a current phase in leading phase side with respect to a speed electromotive force so as to increase a maximum revolution, is employed as the current phase controlling section. Therefore, flow rate is increased by driving the brushless DC motor at a higher revolution, the oil temperature is more rapidly risen, consequently.

DETAILED DESCRIPTION OF THE PREFERRED EMBODIMENTS

Hereinafter, referring to the attached drawings, we explain a method and apparatus for warm up control of an autonomous inverter-driven hydraulic unit of an embodiment according to the present invention.

Figure 1:
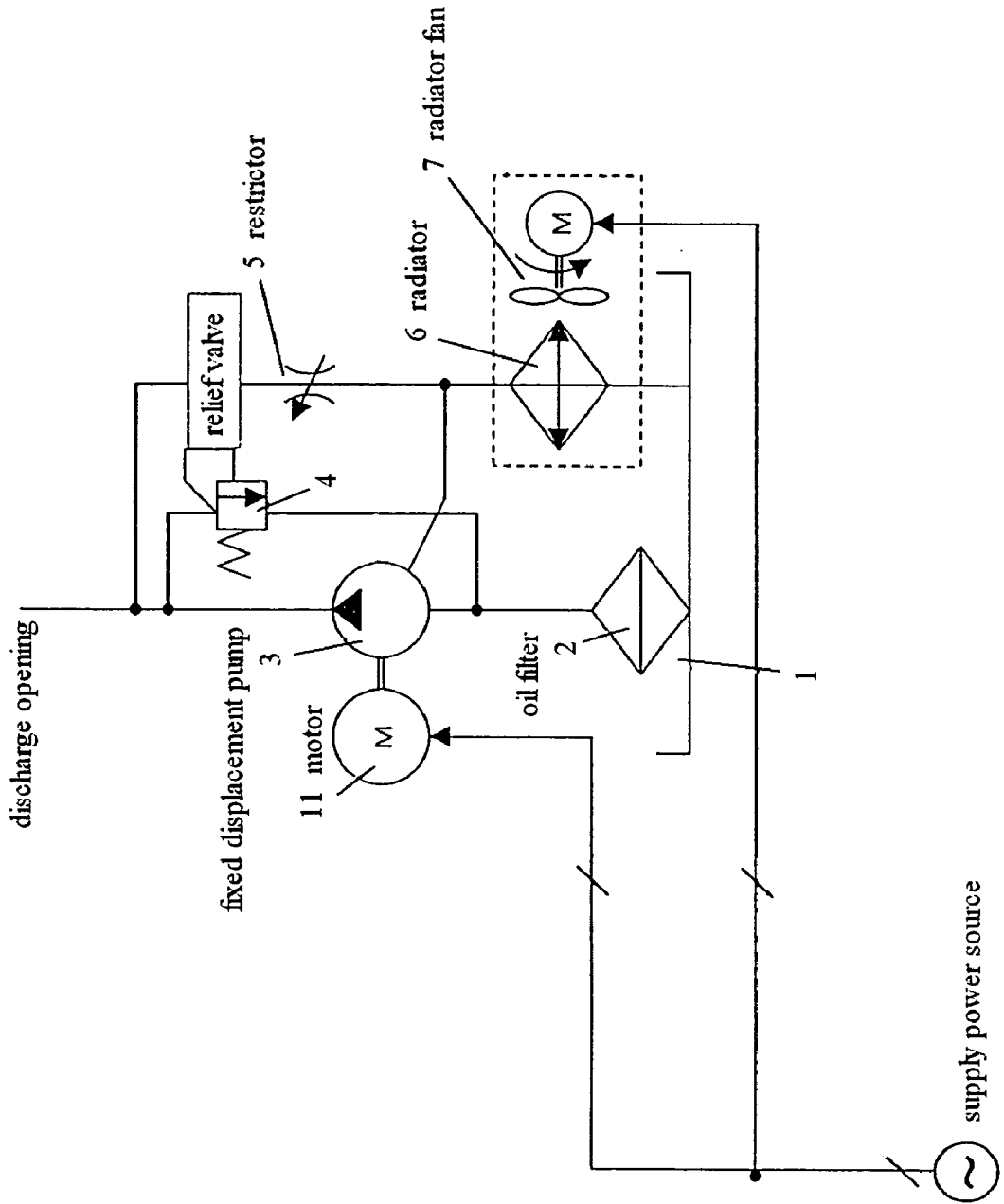
FIG. 1 is a schematic diagram illustrating an arrangement of a conventional hydraulic unit.
Figure 2:
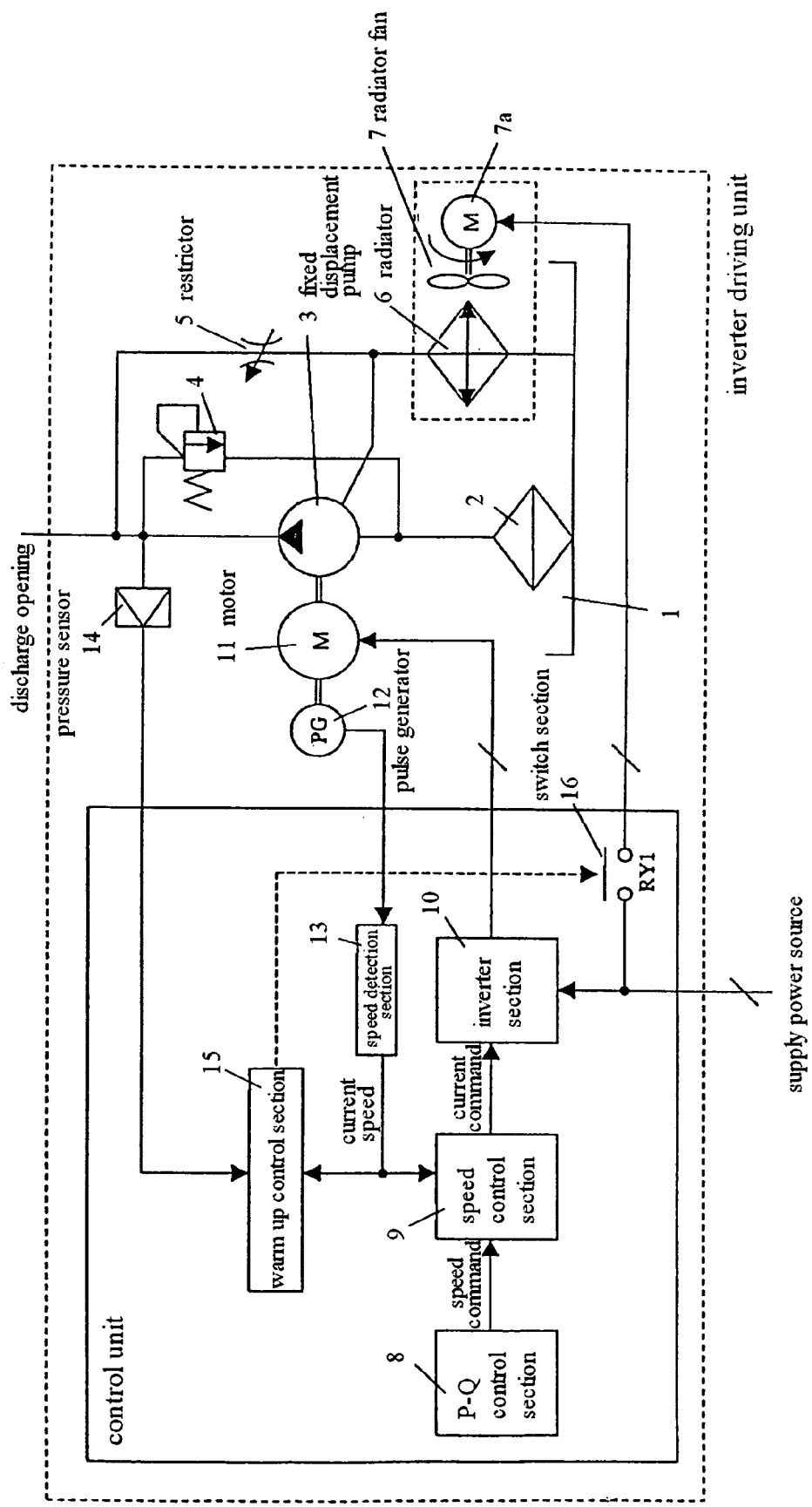
FIG. 2 is a schematic diagram illustrating an arrangement of an autonomous inverter-driven hydraulic unit which is applied a method for warm up control of an embodiment according to the present invention.

FIG. 2 is a schematic diagram illustrating an arrangement of an autonomous inverter-driven hydraulic unit which is applied a method for warm up control of an embodiment according to the present invention.

In the autonomous inverter-driven hydraulic unit, oil is sucked from a tank 1 through an oil filter 2 by a fixed displacement pump 3, and pressured oil is discharged through a discharge opening. A relief valve 4 is provided for preventing a discharge pressure from exceeding a predetermined pressure, and a partial part of the discharged pressured oil is returned to the tank 1 through a restrictor 5 and a radiator 6. Further, oil is returned to the tank 1 through the radiator 6. Furthermore, a radiator fan 7 is provided for promoting cooling of the oil in the radiator 6. The reference numeral 7a represents a fan motor for driving the radiator fan 7.

The autonomous inverter-driven hydraulic unit further comprises a P-Q control section 8, a speed control section 9, an inverter section 10, a motor 11, a pulse generator 12, a speed detection section 13, a pressure sensor 14, a warm up control section 15, and a switch section 16. The P-Q control section 8 outputs a speed command based upon discharge pressure-discharge flow rate characteristic (P-Q characteristic). The speed control section 9 carries out the speed controlling operation based upon the speed command and the current speed, and outputs a current command. The inverter section 10 receives a supplied power source, and works based upon the current command. The motor 11 works by receiving an alternate voltage from the inverter section 10, and drives the fixed displacement pump 3. The pulse generator 12 is connected with the motor 11, and outputs a pulse signal, The speed detection section 13 detects a speed of the motor 11 by measuring an interval between pulse signals which is output from the pulse generator 12 and is received by the speed detection section 13, The pressure sensor 14 detects a pressure of discharged pressured oil. The warm up control section 15 carries out a predetermined processing based upon a current speed and current pressure so as to output a first switch command. The switch section 16 is controlled by the first switch command so as to control on/off of the supplied power source to the fan motor 7a.

Figure 3:
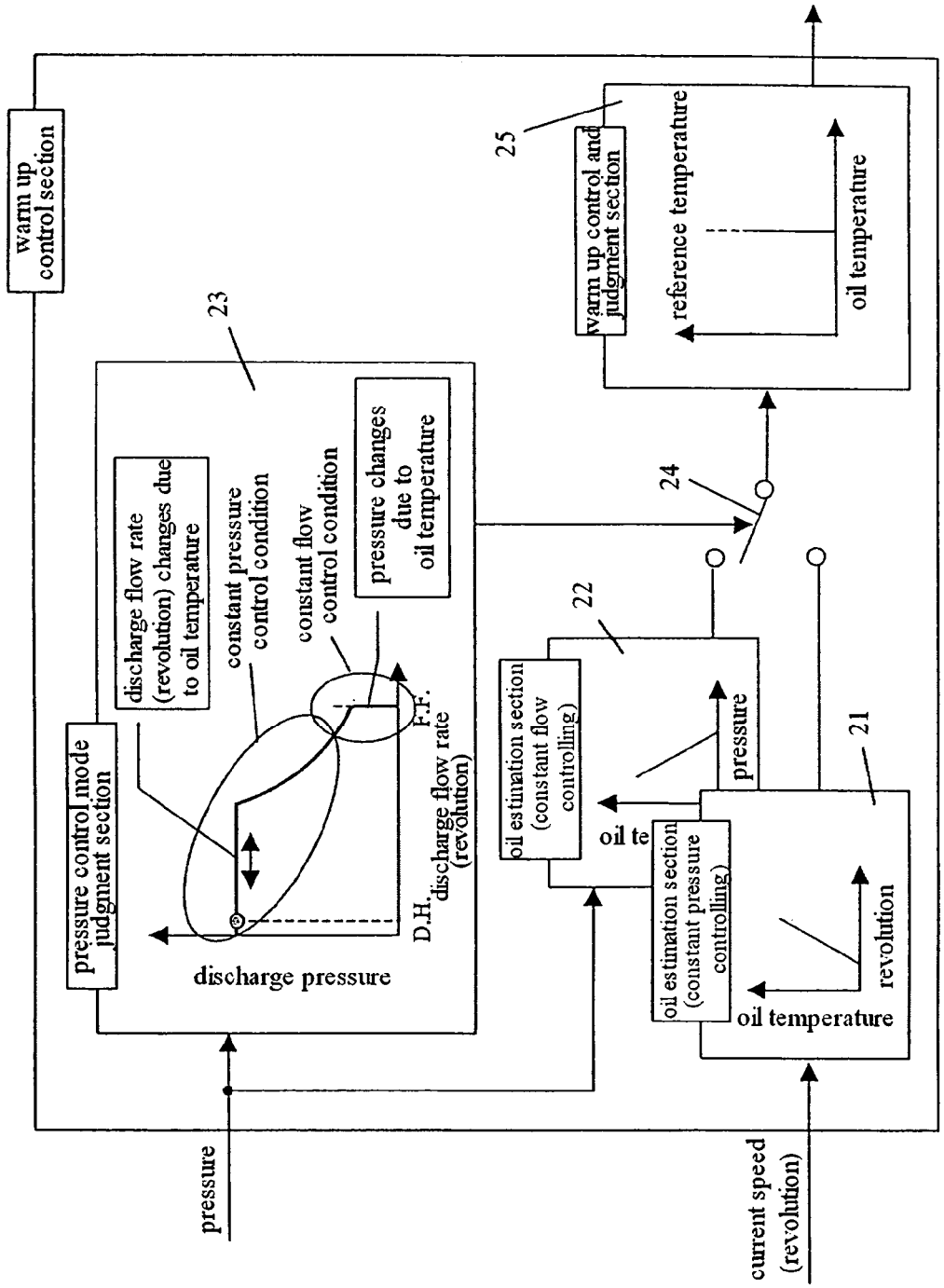
FIG. 3 is a block diagram illustrating an arrangement of a warm up controlling section in detail.

FIG. 3 is a block diagram illustrating an arrangement of the warm up control section 15 in detail.

The warm up control section 15 comprises a first oil temperature estimation section 21, a second oil temperature estimation section 22, a pressure control mode judgment section 23, a switch section 24, and a warm up control and judgment section 25. The first oil temperature estimation section 21 receives a current speed, and estimates an oil temperature under constant pressure control. The second oil temperature estimation section 22 receives a current pressure, and estimates an oil temperature under constant flow control, The pressure control mode judgment section 23 receives a current pressure, judges based upon P-Q characteristic whether it is constant pressure control condition or constant flow control condition, and outputs a second switch command in response to the judgment result, The switch section 24 works based upon the second switch command so as to select the estimated oil temperature from the first oil temperature estimation section 21 or the estimated oil temperature from the second oil temperature estimation section 22, The warm up control and judgment section 25 receives the selected oil temperature, judges whether the oil temperature is greater or smaller than the reference temperature, and outputs a first switch command in response to the judgment result.

Operation in the first oil temperature estimation section 21 is as follows.

When an oil pressure is controlled to be a constant pressure, a revolution of the fixed displacement pump 3 is controlled so as to make a pressure to be a set pressure unless a condition of an oil pressure circuit of load is not changed. When an oil temperature becomes lower, viscosity of the oil becomes lower, pump efficiency becomes increased, so that the revolution becomes lower. Therefore, an oil temperature can be estimated from a revolution under an operating condition with a constant pressure.

Operation in the second oil temperature estimation section 22 is as follows.

When an oil pressure is controlled to be a constant pressure, a revolution of the fixed displacement pump 3 is controlled so as to make a flow rate to be a set flow rate unless a condition of an oil pressure circuit of load is not changed. When an oil temperature becomes lower, viscosity of the oil becomes lower, pump efficiency becomes increased, so that the pressure becomes higher. Therefore, an oil temperature can be estimated from a pressure under an operating condition with a constant flow rate.

Operation of the autonomous inverter-driven hydraulic unit having the above arrangement is as follows.

The speed control section 9 carries out the speed control based upon a difference between the speed command output from the P-Q control section 8 which maintains P-Q characteristic and the current speed, and outputs a current command so as to control the inverter section 10. An AC voltage output from the inverter section 10 is supplied to the motor 11 which drives the fixed displacement pump 3. The fixed displacement pump 3 sucks oil from the tank 1 through the oil filter 2, and discharges the oil. A partial part of the oil flows in a serial circuit made of the restrictor 5 and the radiator 6.

To the warm up control section 15, current speed and a current pressure are supplied, and by the pressure control mode judgment section 23, it is judged whether it is a constant pressure control condition or a constant flow control condition, and a second switch command corresponding to the judgment result is output. Consequently, the estimated oil temperature from the first oil temperature estimation section 21 or the estimated oil temperature from the second oil temperature estimation section 22 is selected by the switch section 24.

When the selected estimated temperature is higher than the reference temperature, a first switch command instructing the switch section 16 to be turned on is output from the warm up control and judgment section 25. Therefore, for this case, the radiator fan 7 works so as to accelerate heat radiation from the radiator 6.

On the contrary, when the selected estimated temperature is lower than the reference temperature, a first switch command instructing the switch section 16 to be turned off is output from the warm up control and judgment section 25. Therefore, for this case, the radiator fan 7 stops so as to suppress heat radiation from the radiator 6. As a result, the warm up of oil can be made rapidly. In other words, a required time period for warm up to a predetermined temperature can be shortened.

The radiator fan 7 may be lowered its revolution instead stopping the radiator fan 7, in a case where the required time period for warm up may become longer to some degree.

Figure 4:
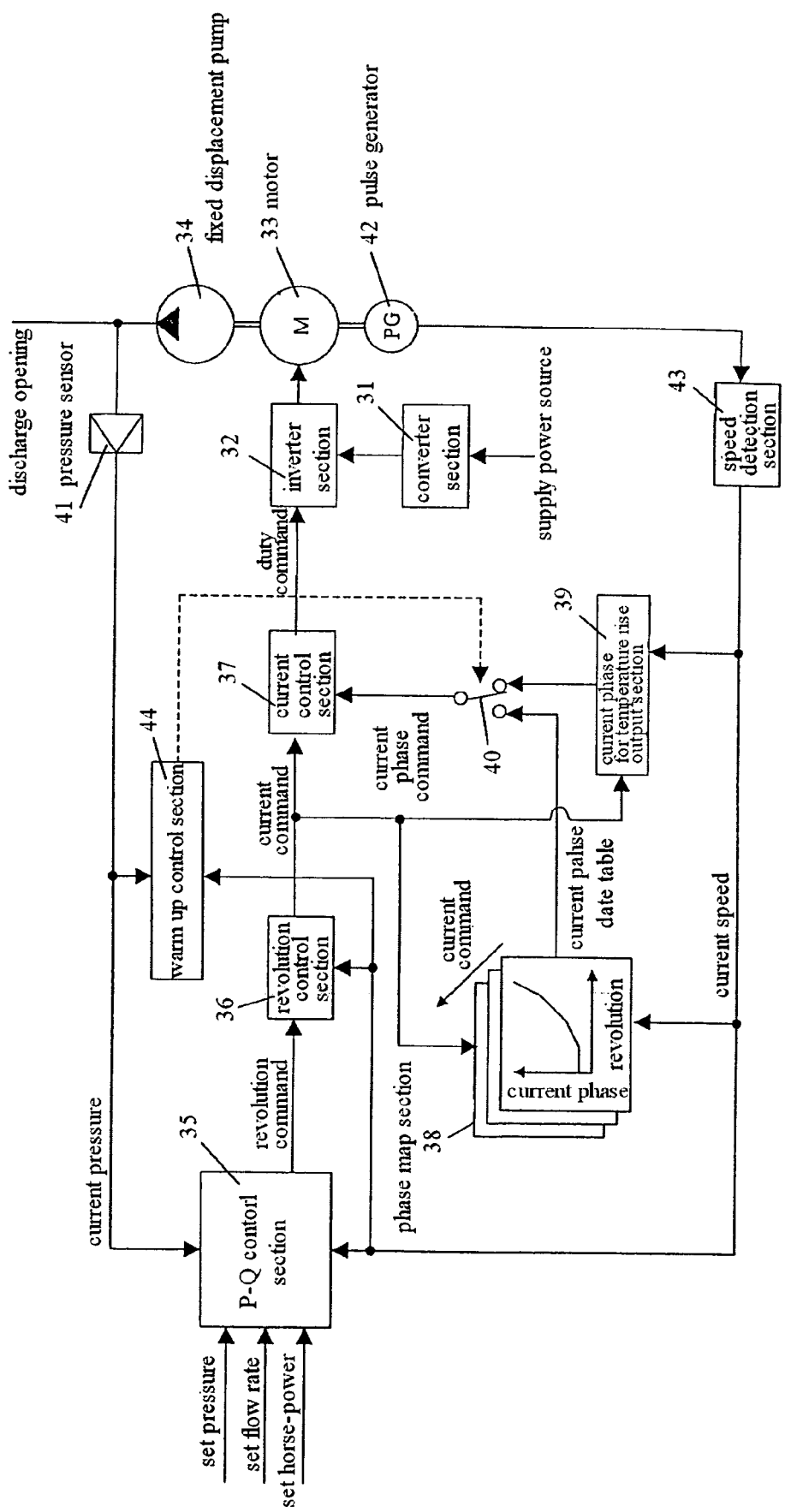
FIG. 4 is a schematic diagram illustrating an arrangement of an autonomous inverter-driven hydraulic unit which is applied a method for warm up control of another embodiment according to the present invention.

FIG. 4 is a schematic diagram illustrating an arrangement of an autonomous inverter-driven hydraulic unit which is applied a method for warm up control of another embodiment according to the present invention.

The autonomous inverter-driven hydraulic unit comprises a converter section 31, an inverter section 32, and a fixed displacement pump 34. The converter section 31 receives an AC power and outputs a DC voltage. The inverter section 32 receives the DC voltage and outputs an AC voltage which is supplied to a brushless DC motor 33. The fixed displacement pump 34 is connected to the brushless DC motor 33, and is driven by the brushless DC motor 33. The brushless DC motor 33 is made in one body with the fixed displacement pump 34.

The autonomous inverter-driven hydraulic unit further comprises a P-Q control section 35, a revolution control section 36, a current control section 37, a phase map section 38, a current phase for temperature rise output section 39, a third switch section 40, a pressure sensor 41, a pulse generator 42, a speed detection section 43, and a warm up control section 44, The P-Q control section 35 receives a set pressure, a set flow rate, and a set horsepower, generates discharge pressure-discharge flow rate characteristic (P-Q characteristic), and outputs a revolution command based upon a current discharge pressure and a current speed. The revolution control section 36 carries out the revolution controlling operation based upon the revolution command and the current speed, and outputs a current command, The current control section 37 carries out the current control operation based upon the current command and the current phase command, and outputs a duty command, The phase map section 38 holds a map of each of current phases with respect to a revolution of every current command, receives a current command and a current speed, and outputs a corresponding current phase date table. The current phase for temperature rise output section 39 receives a current command and a current speed, and outputs a current phase for temperature rise which is to be determined for the temperature rise (a current phase which is shifted from a current phase date table to some degree). The third switch section 40 selects one of a current phase date table and a current phase for temperature rise, and outputs the selected current phase as a current phase command. The pressure sensor 41 detects a discharge pressure from the fixed displacement pump 34. The pulse generator 42 is connected to the motor 33. The speed detection section 43 receives a pulse from the pulse generator 42, and detects a current speed based upon an interval of pulses. The warm up control section 44 receives a current speed and a current pressure, estimates an oil temperature based upon the current speed and the current pressure, judges whether the estimated oil temperature is greater or smaller than the predetermined reference value, generates a switch command in response to the judgment result, and supplies the switch command to the third switch section 40.

The arrangement of the warm up control section 44 is similar to that of the warm up control section 15. The current phase for temperature rise output section 39 may output a previously determined current phase in response to a current command and a current speed. The current phase for temperature rise output section 39 may also calculates a current phase by carrying out a predetermined operation based upon a current command and a current speed, and outputs the calculated current phase.

Operation of the autonomous inverter-driven hydraulic unit having the above arrangement is as follows.

The P-Q control section 35 outputs a revolution command corresponding to a current pressure and a current speed. The revolution control section 36 carries out the revolution control operation based upon the revolution command and the current speed, and outputs a current command. The current control section 37 carries out the current control operation based upon the current command and a current phase command, and supplies a duty command to the inverter section 32. Based upon the output from the inverter section 32, the brushless DC motor 33 is driven, the fixed displacement pump 34 is driven so as to discharge pressured oil.

In this case, when the oil temperature is higher than the reference temperature, the third switch section 40 is operated so as to make a current phase date table to be a current phase command. Therefore, the brushless DC motor 33 can be driven so as to make an efficiency to be an optimum efficiency, consequently the heat generation of the motor is greatly suppressed.

On the contrary, when the oil temperature is lower than the reference temperature, the third switch section 40 is operated so as to make a current phase for temperature rise to be a current phase command. Therefore, wattles current is increased, the heat generation of the motor is accordingly increased, the heat is transmitted to the fixed displacement pump 34, consequently an oil temperature is rapidly increased.

A motor current phase can be shifted in leading phase side with respect to a speed electromotive force. In this case, increase of a speed electromotive force can be suppressed, and high speed rotation can be realized, by carrying out the control such that a rotor flux of the brushless DC motor is weakened by a flux generated at the motor coil. As a result, a flow rate is increased, a partial part of oil is returned to the tank through the relief valve, an oil temperature is rapidly increased due to pressure drop.

Of course, the control of the radiator fan can be added to the embodiment. In this case, the oil temperature can more rapidly be increased.

The processing similar to that of the above embodiment can be performed using computer program and the like.

What is claimed is:

1. A method for warm up control of an autonomous inverter-driven hydraulic unit, the autonomous inverter-driven hydraulic unit driving a fixed volume hydraulic pump using a motor controlled by an inverter, having a heat radiation device provided at a predetermined position of a circulation flow path of an oil which is discharged by the fixed volume hydraulic pump, the method comprising the steps of detecting a temperature of the oil flowing along the circulation flow path to obtain a detected oil temperature;

determining whether or not the detected oil temperature is equal to or less than a predetermined reference temperature; and heating-up the heat radiation device upon determination that the oil temperature is equal to or less than the predetermined reference temperature, the detecting of the temperature of the oil being carried out by estimating an oil temperature from a rotational speed of the motor when a pressure is controlled.

2. A method for warm up control of an autonomous inverter-driven hydraulic unit, the autonomous inverter-driven hydraulic unit driving a fixed volume hydraulic pump using a motor controlled by an inverter, having a heat radiation device provided at a predetermined position of a circulation flow path of an oil which is discharged by the fixed volume hydraulic pump, the method comprising the steps of detecting a temperature of the oil flowing along the circulation flow path to obtain a detected oil temperature;

determining whether or not the detected oil temperature is equal to or less than a predetermined reference temperature; and heating-up the heat radiation device upon determination that the oil temperature is equal to or less than the predetermined reference temperature, the detecting of the temperature of the oil being carried out by estimating an oil temperature from a pressure when a flow rate is controlled.

3. A method for warm up control of an autonomous inverter-driven hydraulic unit, the autonomous inverter-driven hydraulic unit being arranged to drive a fixed volume hydraulic pump using an integral-type motor controlled by an inverter, the method comprising the steps of
detecting a temperature of the oil flowing along the circulation flow path to obtain a detected oil temperature;
determining whether or not the detected oil temperature is equal to or less than a predetermined reference temperature; and
shifting a current phase from an optimum current phase for increasing heat generation of the motor upon determination that the oil temperature is equal to or less than the predetermined reference temperature.

4. The method as set forth in claim 3, wherein
the motor is a brushless DC motor, and
the shifting of the current phase from the optimum current phase is carried out by shifting the current phase in a leading phase side with respect to a speed electromotive force so as to increase a maximum revolution.

5. An apparatus for warm up control of an autonomous inverter-driven hydraulic unit, the autonomous inverter-driven hydraulic unit driving a fixed volume hydraulic pump using a motor controlled by an inverter, having a heat radiation device provided at a predetermined position of a circulation flow path of an oil which is discharged by the fixed volume hydraulic pump, the apparatus comprising:
an oil temperature detection device configured and arranged to detect a temperature of the oil flowing along the circulation flow path to obtain a detected oil temperature;
a temperature determining section configured and arranged to determine whether or not the detected oil temperature is equal to or less than a predetermined reference temperature; and
a warm up device configured and arranged to heat-up the heat radiation device in response a determination by the temperature determining section that the oil temperature is equal to or less than the predetermined reference temperature,
the oil temperature detection device being configured and arranged to carry out detection of the oil temperature by estimating an oil temperature from a rotational speed of the motor when a pressure is controlled.

6. The apparatus as set forth in claim 5, wherein
the heat radiation device includes a radiator,
the warm up device includes a radiator fan controlling device configured and arranged to control a radiator fan, and
the radiator fan is configured and arranged to lower a heat radiation efficiency of the radiator in response to the determination obtained by the temperature determining device indicating that the oil temperature is equal to or less than the predetermined reference temperature.

7. An apparatus for warm up control of an autonomous inverter-driven hydraulic unit, the autonomous inverter-driven hydraulic unit driving a fixed volume hydraulic pump using a motor controlled by an inverter, having a heat radiation device provided at a predetermined position of a circulation flow path of an oil which is discharged by the fixed volume hydraulic pump, the apparatus comprising:
an oil temperature detection device configured and arranged to detect a temperature of the oil flowing along the circulation flow path to obtain a detected oil temperature;
a temperature determining section configured and arranged to determine whether or not the detected oil temperature is equal to or less than a predetermined reference temperature; and
a warm up device configured and arranged to heat-up the heat radiation device in response a determination by the temperature determining section that the oil temperature is equal to or less than the predetermined reference temperature,
the oil temperature detection device being configured and arranged to carry out the detection of an oil temperature by estimating an oil temperature from a pressure when a flow rate is controlled.

8. An apparatus for warm up control of an autonomous inverter-driven hydraulic unit, the autonomous inverter-driven hydraulic unit being arranged to drive a fixed volume hydraulic pump using an integral-type motor controlled by an inverter, the apparatus comprising:
an oil temperature detection device configured and arranged to detect a temperature of the oil flowing along a circulation flow path;
a temperature determining section configured and arranged to determine whether or not the detected oil temperature is equal to or less than a predetermined reference temperature; and
a current phase controlling device configured and arranged to shift for a current phase from an optimum current phase for increasing heat generation of the motor in response to a determination of the temperature determining section indicating that the oil temperature is equal to or less than the predetermined reference temperature.

9. The apparatus as set forth in claim 8, wherein
the motor is a brushless DC motor, and
the current phase controlling device configured and arranged to shift a current phase from an optimum current phase by shifting a current phase in a leading phase side with respect to a speed electromotive force so as to increase a maximum rotational speed.

10. A method for warm up control of an autonomous inverter-driven hydraulic unit, the autonomous inverter-driven hydraulic unit driving a fixed volume hydraulic pump using a motor controlled by an inverter, having a heat radiation device provided at a predetermined position of a circulation flow path of an oil which is discharged by the fixed volume hydraulic pump, the method comprising the steps of
detecting a temperature of the oil flowing along the circulation flow path to obtain a detected oil temperature;
determining whether or not the detected oil temperature is equal to or less than a predetermined reference temperature; and
heating-up the heat radiation device upon determination that the oil temperature is equal to or less than the predetermined reference temperature, the heating-up of the heat radiation device being carried out by controlling a radiator fan so as to lower a heat radiation efficiency of a radiator that is used as the heat radiation device,
the detecting of the temperature of the oil being carried out by estimating an oil temperature from a rotational speed of the motor when a pressure is controlled.

11. The method as set forth in claim 10, wherein
the controlling of the radiator fan for lowering the heat radiation efficiency is carried out by decreasing a rotational speed of the radiator fan or stopping the radiator fan.

12. A method for warm up control of an autonomous inverter-driven hydraulic unit, the autonomous inverter-driven hydraulic unit driving a fixed volume hydraulic pump using a motor controlled by an inverter, having a heat radiation device provided at a predetermined position of a circulation flow path of an oil which is discharged by the fixed volume hydraulic pump, the method comprising the steps of
  detecting a temperature of the oil flowing along the circulation flow path to obtain a detected oil temperature;
  determining whether or not the detected oil temperature is equal to or less than a predetermined reference temperature; and
  heating-up the heat radiation device upon determination that the oil temperature is equal to or less than the predetermined reference temperature, the heating-up of the heat radiation device being carried out by controlling a radiator fan so as to lower a heat radiation efficiency of a radiator that is used as the heat radiation device,
  the detecting of the temperature of the oil being carried out by estimating an oil temperature from a pressure when a flow rate is controlled.

13. The method as set forth in claim 12, wherein
the controlling of the radiator fan for lowering the heat radiation efficiency is carried out by decreasing a rotational speed of the radiator fan or stopping the radiator fan.

14. An apparatus for warm up control of an autonomous inverter-driven hydraulic unit, the autonomous inverter-driven hydraulic unit driving a fixed volume hydraulic pump using a motor controlled by an inverter, having a heat radiation device provided at a predetermined position of a circulation flow path of an oil which is discharged by the fixed volume hydraulic pump, the apparatus comprising:
  an oil temperature detection device configured and arranged to detect a temperature of the oil flowing along the circulation flow path to obtain a detected oil temperature;
  a temperature determining section configured and arranged to determine whether or not the detected oil temperature is equal to or less than a predetermined reference temperature; and
  a warm up device configured and arranged to heat-up the heat radiation device in response a determination by the temperature determining section that the oil temperature is equal to or less than the predetermined reference temperature,
  the heat radiation device including a radiator,
  the warm up device including a radiator fan controlling device configured and arranged to control a radiator fan,
  the radiator fan being configured and arranged to lower a heat radiation efficiency of the radiator in response to the determination obtained by the temperature determining device indicating that the oil temperature is equal to or less than the predetermined reference temperature, and
  the oil temperature detection device being configured and arranged to carry out detection of the oil temperature by estimating an oil temperature from a rotational speed of the motor when a pressure is controlled.

15. The apparatus as set forth in claim 14, wherein
the radiator fan controlling device is configured and arranged to decrease a rotational speed of the radiator fan or stops the radiator fan for lowering the heat radiation efficiency.

16. An apparatus for warm up control of an autonomous inverter-driven hydraulic unit, the autonomous inverter-driven hydraulic unit driving a fixed volume hydraulic pump using a motor controlled by an inverter, having a heat radiation device provided at a predetermined position of a circulation flow path of an oil which is discharged by the fixed volume hydraulic pump, the apparatus comprising:
  an oil temperature detection device configured and arranged to detect a temperature of the oil flowing along the circulation flow path to obtain a detected oil temperature;
  a temperature determining section configured and arranged to determine whether or not the detected oil temperature is equal to or less than a predetermined reference temperature; and
  a warm up device configured and arranged to heat-up the heat radiation device in response a determination by the temperature determining section that the oil temperature is equal to or less than the predetermined reference temperature,
  the heat radiation device including a radiator,
  the warm up device including a radiator fan controlling device configured and arranged to control a radiator fan,
  the radiator fan being configured and arranged to lower a heat radiation efficiency of the radiator in response to the determination obtained by the temperature determining device indicating that the oil temperature is equal to or less than the predetermined reference temperature, and
  the oil temperature detection device being configured and arranged to carry out the detection of an oil temperature by estimating an oil temperature from a pressure when a flow rate is controlled.

17. The apparatus as set forth in claim 16, wherein
the radiator fan controlling device is configured and arranged to decrease a rotational speed of the radiator fan or stops the radiator fan for lowering the heat radiation efficiency.

* * * * *